R. LOCKYER.
CAMERA ATTACHMENT.
APPLICATION FILED DEC. 21, 1912.

1,109,077.

Patented Sept. 1, 1914.
3 SHEETS—SHEET 1.

Inventor
R. Lockyer

Witnesses
By
Watson E. Coleman,
Attorney

R. LOCKYER.
CAMERA ATTACHMENT.
APPLICATION FILED DEC. 21, 1912.

1,109,077.

Patented Sept. 1, 1914.
3 SHEETS—SHEET 2.

Witnesses
Chas. L. Griesbauer.
Herbert J. Jacobi.

Inventor
R. Lockyer,
By Watson E. Coleman,
Attorney

R. LOCKYER.
CAMERA ATTACHMENT.
APPLICATION FILED DEC. 21, 1912.
1,109,077.
Patented Sept. 1, 1914.
3 SHEETS—SHEET 3.
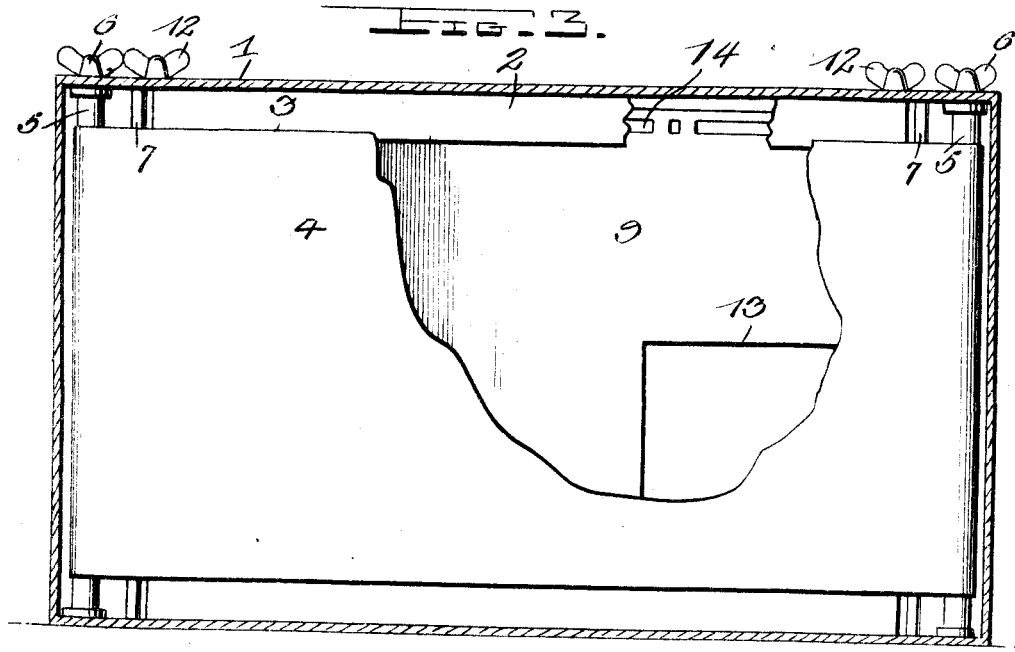
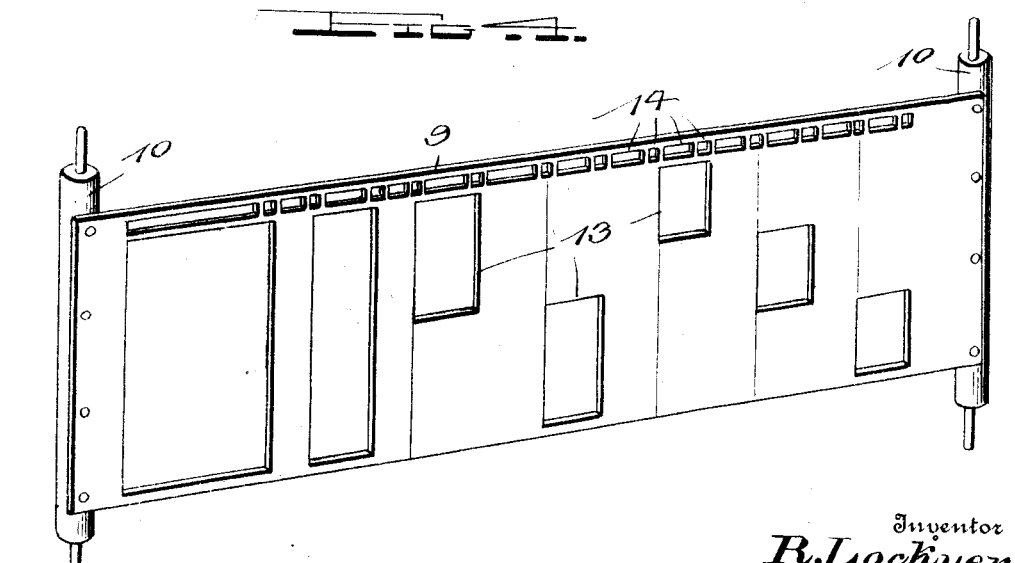
Inventor
R. Lockyer,
Witnesses
Chas. L. Griesbauer.
Herbert J. Jacobi.
By Watson E. Coleman,
Attorney

UNITED STATES PATENT OFFICE.

ROBERT LOCKYER, OF SARNIA, ONTARIO, CANADA.

CAMERA ATTACHMENT.

1,109,077. Specification of Letters Patent. Patented Sept. 1, 1914.

Application filed December 21, 1912. Serial No. 738,044.

*To all whom it may concern:*

Be it known that I, ROBERT LOCKYER, a subject of the King of England, residing at Sarnia, in the Province of Ontario and Dominion of Canada, have invented certain new and useful Improvements in Camera Attachments, of which the following is a specification, reference being had to the accompanying drawings.

This invention relates to new and useful improvements in camera attachments and my object is to provide means whereby a plurality of photographs may be taken on a stationary sensitized body.

A further object of the invention resides in providing such means as may be readily used in connection with any camera, whether designed for use in connection with a plate or film and a further object resides in providing a flexible curtain or apron adapted to be disposed in the camera forward of the sensitized body.

Still another object of the invention resides in providing means to manually operate this curtain or apron, and still another object resides in the provision of an indicating mechanism carried by the camera in connection with said curtain to permit the operator to observe the position of the curtain with respect to the sensitized body.

With these and other objects in view, the invention consists in the novel features of construction, combination and arrangement of parts as will be hereinafter referred to and more particularly pointed out in the specification and claims.

Figure 1:
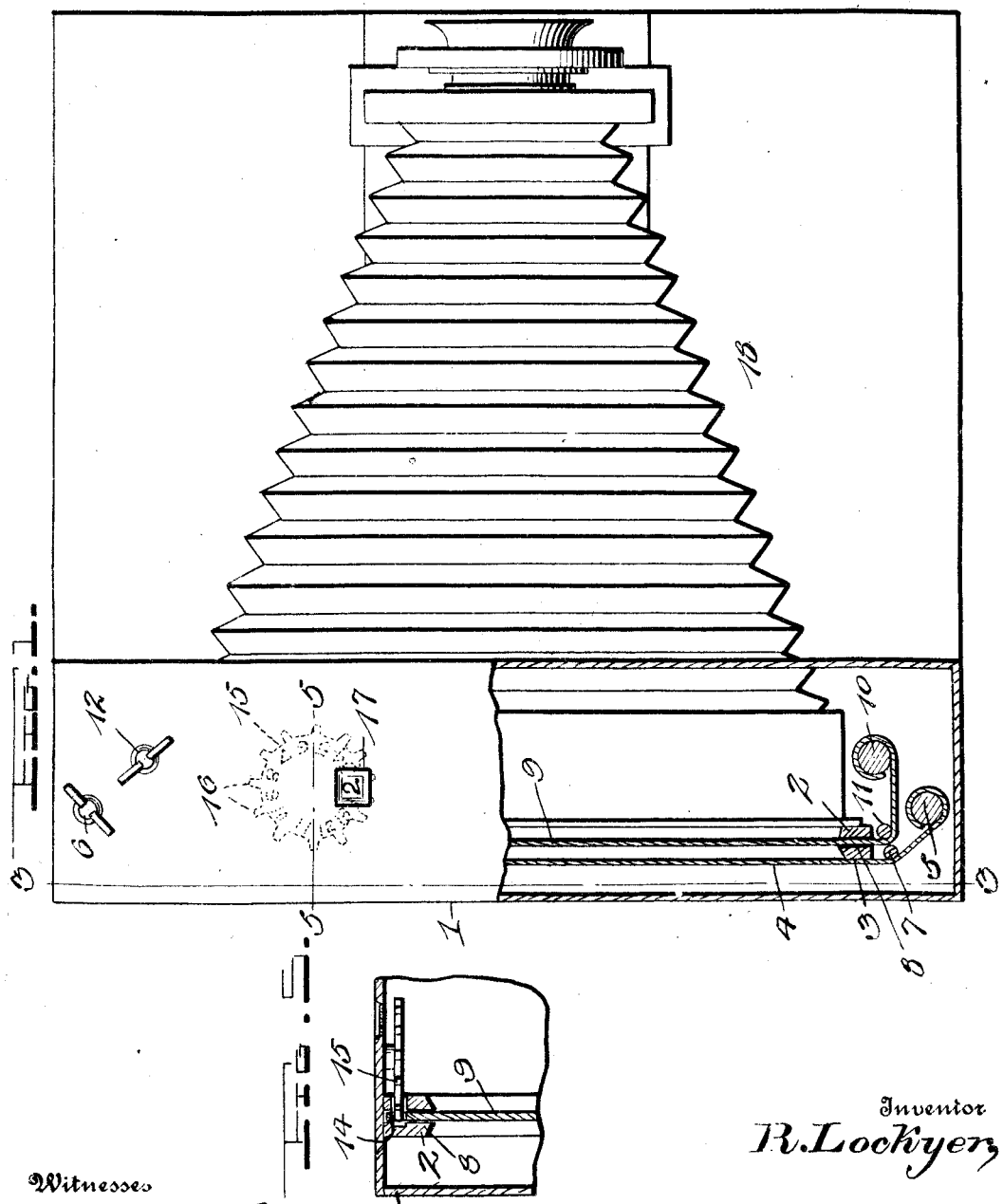
Figure 2:
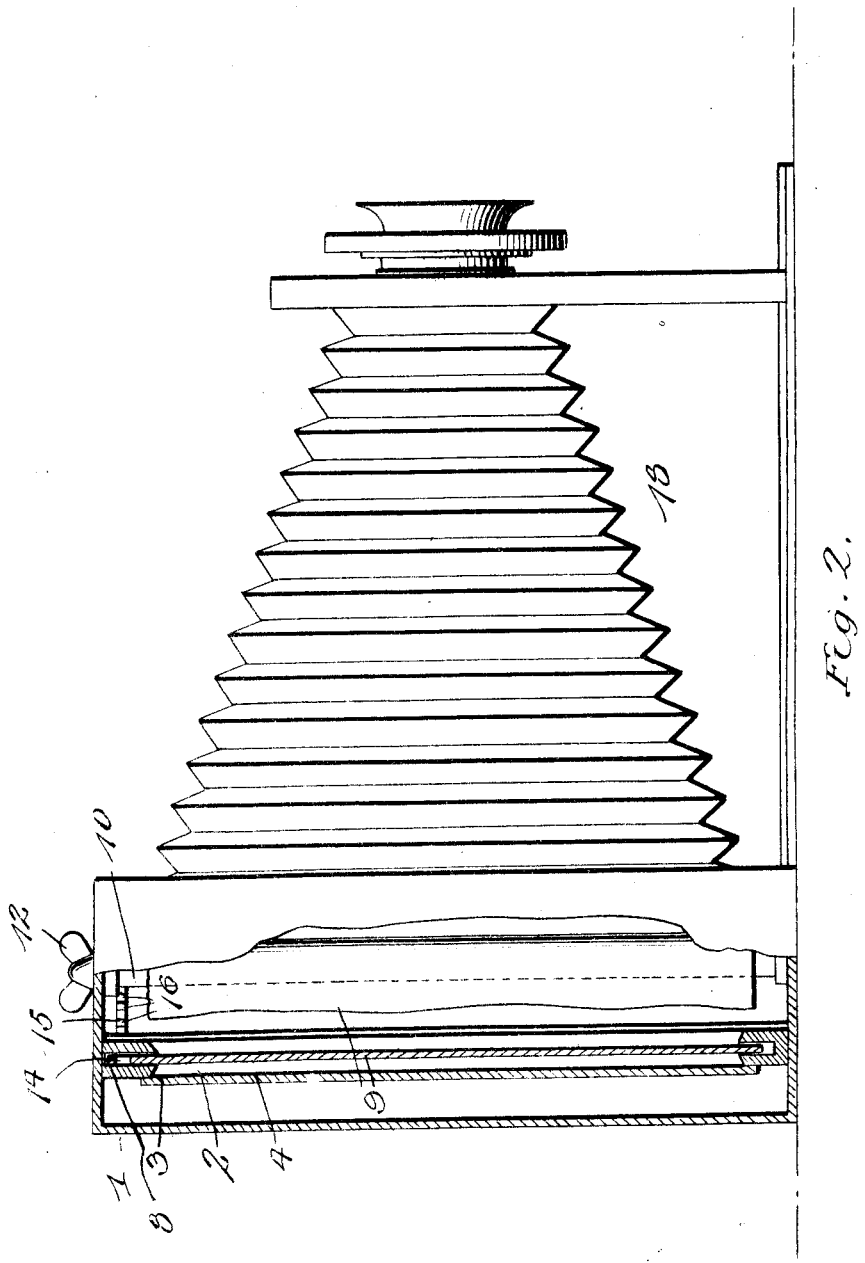

In the accompanying drawings forming a part of this application, Figure 1 is a top plan view of a camera with parts broken away and illustrating an attachment constructed in accordance with an embodiment of my invention in applied position. Fig. 2 is a side elevation thereof with parts broken away as illustrated in Fig. 1. Fig. 3 is a vertical section through the device as seen on line 3—3, Fig. 1. Fig. 4 is a perspective view of the curtain or apron as herein disclosed and Fig. 5 is a fragmentary vertical section as seen on line 5—5, Fig. 1.
In describing my invention, I shall refer to the drawings in which similar reference characters designate corresponding parts throughout the several views and in which—

1 indicates the outer frame and 2 the inner frame of the usual or any preferred form of camera, the inner frame 2 being provided with a back surface 3, upon which a sensitized body, such as a film 4 is adapted to rest. For convenience, I have shown a film, but it will be understood that a plate may be used, if desired. At the ends of this film 4, mounted in the usual or any preferred manner, are the film spools or rollers 5, which are rotatably mounted on the outer frame 1 and operated by means of the hand operating devices 6. The auxiliary rollers or the like 7 are also mounted in said outer frame immediately adjacent the back 3, over which said film is adapted to be guided as the latter is rolled on the spools or rollers 5.

The inner frame 2, is provided with a transverse slot 8 through which is adapted to be disposed my improved device comprising a curtain or apron 9 formed of any desired flexible substance adapted to prevent rays of light from reaching the sensitized body. This curtain or apron 9 is of any desired length, the ends thereof being suitably engaged with rollers or spools 10 which are rotatably mounted in the outer frame 1 and also mounted in said frame 1, immediately adjacent the ends of the slot 8 and to the rear of the rollers 10 are the guide or auxiliary rollers 11 over which said curtain or apron extends. Hand operating devices 12 are also provided and engaged with the ends of the rollers 10 so that the latter may be rotated to correspondingly roll the curtain or apron 9 on one roller or the other and said curtain or apron is provided with a series of openings 13, which openings are of various sizes and arranged in various positions on the curtain or apron. These openings are arranged in the curtain or apron at such distances apart that but a single opening will be disposed before the film at a time, and as the same are arranged at various positions on said curtain, it will be appreciated that by the rolling of the curtain or apron on one roller or the other, a plurality of exposures on said sensitive body may be made through these openings and said sensitized body entirely covered thereby, if desired. Thus, it will be seen that while a plurality of openings are provided in the curtain, only such portions of the film or other sensitized body will be exposed to the light as are immediately in the rear of the openings in said curtain or apron 9.

One edge of the curtain or apron 9 is provided with a plurality of small openings 14 which are arranged at regular intervals thereon and numbered to correspond with certain predetermined spaces on the apron or curtain 9 and a disk or the like 15 rotatably mounted on a vertical axis in the outer frame 1, is provided with a plurality of peripheral lugs 16 which are adapted to enter the openings 14 of said apron or curtain. The disk is also provided with a plurality of numbers adapted to correspond with the numbers on the curtain and an opening 17 in the upper face of the outer frame 1 provides a means, whereby the operator may be able to observe said disk to be notified at what position the various openings in the apron are located with respect to the film or plate.

From this construction, it will be seen that I have provided an improved camera attachment whereby a plurality of photographs may be taken on a single sensitized body or surface, the sensitized surface remaining stationary throughout the operation of the device. Of course, photographs of various sizes may be made on the film, according to the size of the openings in the curtain or apron which is brought between the lens and film and when that portion of the film which is disposed in effective position has been covered with exposures, the same may be rolled and another portion of said film brought into position.

From the foregoing description of the construction of my improved attachment, the operation thereof will be readily understood and it will be seen that I have provided a simple, inexpensive and efficient means for making a plurality of photographs on a single plate or film.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a device of the class described, the combination with a camera box adapted to receive a sensitized body therein; of a curtain carried within said box in advance of the portion thereof for the reception of said body, said curtain being provided with a plurality of openings to enable a plurality of exposures to be made on said body, means for operating said curtain, and means in connection with said curtain for indicating to the operator which of the openings in said curtain is immediately forward of the sensitized body.

2. In a device of the class described, the combination with a camera box adapted to receive a sensitized body therein; of a curtain extended transversely of the box in advance of said sensitized body, said curtain being provided with a plurality of spaced openings to enable a plurality of exposures to be made on the body, means to manually operate said body, and an indicating disk rotatably mounted in the top of said camera box and having connection with said curtain to disclose to the operator which of the various openings are in position in front of the sensitized body.

3. In a device of the class described, the combination with a camera box having an opening in the top thereof, said box being adapted to receive a sensitized body therein; of a curtain carried on said box in advance of the portion thereof receiving said body, said curtain being provided with a plurality of openings whereby to enable a plurality of exposures to be made on said body, said curtain being also provided with a plurality of additional and smaller openings adjacent its upper edge, means to manually operate said curtain, and an indicating disk rotatably mounted in the top of said box and provided with peripheral teeth to engage the additional openings in said curtain, said disk being observed through the opening in the top of said box to disclose to the operator which of the various openings in the curtain is in position immediately in front of the sensitized body.

4. The combination with a camera box adapted to receive a sensitized body therein, of a curtain carried by said box in advance of said sensitized body, said curtain being provided with a plurality of spaced openings to enable a plurality of exposures to be made on the sensitized body, means for operating said curtain, and a movable member coacting with the curtain to disclose to the operator which of the various openings is in position in front of the sensitized body.

5. The combination with a camera box adapted to receive a sensitized body therein, of a curtain extended transversely of the box in advance of said sensitized body, said curtain being provided with a plurality of spaced openings to enable a plurality of exposures to be made on the body, means for operating said curtain, and an indicating disk rotatably supported by said camera box and having connection with said curtain to disclose to the operator which of the various openings is in position in front of the sensitized body.

6. The combination with a camera box adapted to receive a sensitized body therein, of a curtain carried within said box in advance of the portion thereof for the reception of said body, said curtain being provided with a plurality of openings to enable a plurality of exposures to be made, means for operating said curtain, and means carried by the top of the camera box in connection with said curtain for indicating to the operator which of the openings in said curtain is immediately forward of the portion of the box adapted to receive the sensitized body.

In testimony whereof I hereunto affix my signature in the presence of two witnesses.

ROBT. LOCKYER.

Witnesses:
  WM. LOCKYER,
  JNO. R. SIMPSON.